(12) United States Patent
Michaelsen

(10) Patent No.: US 11,891,985 B2
(45) Date of Patent: Feb. 6, 2024

(54) FILTER SYSTEM FOR PROVIDING AIR INTO A GENERATOR OF A WIND TURBINE

(71) Applicant: Siemens Gamesa Renewable Energy A/S, Brande (DK)

(72) Inventor: Claus Michaelsen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 945 days.

(21) Appl. No.: 16/607,409

(22) PCT Filed: Jan. 31, 2018

(86) PCT No.: PCT/EP2018/052357
§ 371 (c)(1),
(2) Date: Oct. 23, 2019

(87) PCT Pub. No.: WO2018/197058
PCT Pub. Date: Nov. 1, 2018

(65) Prior Publication Data
US 2020/0132055 A1   Apr. 30, 2020

(30) Foreign Application Priority Data

Apr. 24, 2017   (DE) .................... 10 2017 206 859.0

(51) Int. Cl.
*F03D 80/60*   (2016.01)
*F03D 9/25*   (2016.01)
(Continued)

(52) U.S. Cl.
CPC ........... *F03D 80/60* (2016.05); *B01D 46/001* (2013.01); *B01D 46/0005* (2013.01); *F03D 9/25* (2016.05);
(Continued)

(58) Field of Classification Search
None
See application file for complete search history.

(56) References Cited

U.S. PATENT DOCUMENTS 5,689,969 A * 11/1997 Conroy .............. B01D 39/1676
62/262
5,827,340 A * 10/1998 Fiske ................. B01D 46/0005
55/483

(Continued)

FOREIGN PATENT DOCUMENTS

CN   201621832 U   11/2010
CN   203879691 U   10/2014
(Continued)

OTHER PUBLICATIONS

Office Action in corresponding Chinese Patent Application No. 201880042483.8 dated Aug. 3, 2020. 8 pages.
(Continued)

*Primary Examiner* — Brit E. Anbacht
(74) *Attorney, Agent, or Firm* — Schmeiser, Olsen & Watts LLP

(57) ABSTRACT

Provided is a filter device configured for providing air for a generator of a wind turbine. The filter device includes a housing including a filter, at least one attaching element configured for attaching the housing to a drive end side of the generator, such that the air is guidable through the filter into the generator. Further, a wind turbine is provided which includes a filter device for providing air for a generator of the wind turbine. Furthermore, a method for arranging a filter device configured for providing air for a generator of a wind turbine is also provided.

13 Claims, 4 Drawing Sheets

(51) Int. Cl.
  *B01D 46/00* (2022.01)
  *H02K 7/18* (2006.01)
  *H02K 9/26* (2006.01)
  *H02K 11/01* (2016.01)

(52) U.S. Cl.
  CPC ............ *H02K 7/1838* (2013.01); *H02K 9/26* (2013.01); *H02K 11/0141* (2020.08); *B01D 2265/023* (2013.01); *B01D 2279/35* (2013.01)

(56) References Cited

U.S. PATENT DOCUMENTS

| | | | | |
|---|---|---|---|---|
| 6,197,077 | B1* | 3/2001 | Simmons | B01D 46/10 55/491 |
| 6,221,120 | B1* | 4/2001 | Bennington | F24F 13/085 55/525 |
| 6,793,715 | B1* | 9/2004 | Sandberg | B01D 46/10 55/501 |
| 2010/0140952 | A1 | 6/2010 | Jansen | |
| 2011/0225939 | A1* | 9/2011 | Loggins | F24F 13/085 55/357 |
| 2015/0375152 | A1* | 12/2015 | Simmons | B01D 46/0005 55/491 |
| 2016/0052095 | A1* | 2/2016 | Simmons | F24F 13/084 29/281.5 |
| 2017/0128868 | A1* | 5/2017 | Simmons | E06B 9/24 |
| 2017/0128869 | A1* | 5/2017 | Simmons | F24F 13/082 |
| 2018/0038351 | A1* | 2/2018 | Jacobsen | H02K 9/04 |
| 2018/0185970 | A1* | 7/2018 | Simmons | B01D 46/10 |
| 2018/0274522 | A1* | 9/2018 | Airoldi | F03D 9/25 |
| 2019/0140518 | A1* | 5/2019 | Groenheden | H02K 9/04 |
| 2020/0177052 | A1* | 6/2020 | Fujiwara | H02K 9/06 |
| 2020/0386210 | A1* | 12/2020 | Hardwicke, Jr. | F03D 80/60 |
| 2021/0086120 | A1* | 3/2021 | Burkhart-Day | B01D 46/0005 |
| 2022/0233983 | A1* | 7/2022 | Carr | F24F 8/108 |

FOREIGN PATENT DOCUMENTS

| | | | | |
|---|---|---|---|---|
| CN | 105221360 | A | 1/2016 | |
| EP | 1837519 | A2 * | 9/2007 | ............ F03D 9/002 |
| EP | 2784306 | A1 | 10/2014 | |
| EP | 2821641 | A1 | 1/2015 | |
| EP | 2958215 | A1 | 12/2015 | |
| WO | 2012052022 | A1 | 4/2012 | |
| WO | WO 2012052022 | A1 | 4/2012 | |

OTHER PUBLICATIONS

International Search Report and the Written Opinion of the International Searching Authority dated Jun. 5, 2018 for Application No. PCT/EP2018/052357.

* cited by examiner

FILTER SYSTEM FOR PROVIDING AIR INTO A GENERATOR OF A WIND TURBINE

CROSS-REFERENCE TO RELATED APPLICATIONS

This application claims priority to PCI Application No. PCT/EP2018/052357, having a filing date of Jan. 31, 2018, which is based on German Application No. 10 2017 206 859.0, having a filing date of Apr. 24, 2017, the entire contents both of which are hereby incorporated by reference.

FIELD OF TECHNOLOGY

The following relates to the field of wind turbines equipped with electrical generators and a filter device configured for providing air for a generator of a wind turbine. Specifically, the following relates to a filter device configured for providing air for a generator of a wind turbine, wherein the air is provided from the outside of a wind turbine into the generator through the filter device. Further, the following relates to a method for arranging a filter device configured for providing air for a generator of a wind turbine.

BACKGROUND

Generators used in many wind turbine types have to work with high precision. In operation, they have to maintain a stable working performance. During operation the generator generates heat because of the power generation, which heat has to be limited for preventing damages at the generator and to ensure a stable working performance. Hence, the generator is cooled by fluid, in particular by air, which is guided into the generator for cooling. The used fluid (air) has to be cleaned, such that it is free from dirt and particles which could delimit the cooling quality or may cause damage in the inside of the generator. In particular contaminated fluid may cause electronic failures and production power loss, when the cooled fluid (air) is inserted into the generator.

There may be a need for protecting a generator of a wind turbine of contaminated fluid, in particular of dirt air and of dirt water, for ensuring a proper cooling of the generator, such that the generator is able to operate efficiently and reliably.

SUMMARY

An aspect relates to a filter device configured for providing air for a generator of a wind turbine. The filter device comprises a housing comprising a filter, at least one attaching element configured for attaching the housing to a drive end side of the generator, such that the air is guidable through the filter into the generator.

According to a further aspect of the embodiments of the invention there is provided a method for arranging a filter device configured for providing air for a generator of a wind turbine, the method comprising attaching a housing of the filter device by at least one attaching element to a drive end side of a generator of the wind turbine, such that the air is guidable through the filter device into the generator.

In this document the term "drive end side" may particularly denote a front side of the generator, wherein the front side of the generator is the side located at the nearest to the wind turbine rotor (which comprises the blades of the wind turbine). In other words, the drive end side is the side of the generator with which it is coupled to the rotor of the wind turbine for receiving the mechanical energy of the wind. The drive end side of the generator is facing a spinner and a hub of the wind turbine. The spinner may be a glass fiber cover of the hub and the spinner may be mounted on the hub. In between the spinner and the hub a space is provided. The air inside of this provided space is used to be filtered by the filter device attached at the drive end side and is guided into the generator. The filter system may be located at the drive end of the rotor, placed in the space between the spinner and the hub.

The term "attaching element" may particularly denote an element which is able to provide a connection between the housing of the filter device and the drive end side of the generator. By the attaching element the housing is coupled to the drive end side. The attaching element may be a mechanical element providing a stiff and detachable connection between the housing and the drive end side. The filter device according to the present embodiments may comprise at least one attaching element, but the filter device may also comprise a plurality of attaching elements. The attaching element may be formed in such a manner that the filter device may be detachably mounted to the drive end side. Hence, the attaching element may be used to attach and to detach the housing of the filter device to the drive end side of the generator.

The filter used in the filter device may be the part which is actively filtering the undesired particles out from the fluid, in particular from the air. The filter may be capable to filter the air which should be guided into the generator, such that clean air may be provided for the generator. The filter may be comprised of one part or the filter may be comprised of a plurality of filter elements. The filter is designed in such a manner that harmful particles and/or contaminations of the air may be removed from the air to ensure reliable operation of the generator. The filter may be made of a plastic material, or metal material.

The filter is arranged inside the housing of the filter device. The housing may be able to receive at least one filter or a plurality of filter elements.

The housing of the filter device may protect the filter, such that for example ingressed water inside the wind turbine cannot get in directly contact with the filter. For example, the housing may be able to work as a drip cap, wherein water that hits the housing will run off a surface of the housing and will drop off the housing on the hub of the wind turbine. Hence, ingressed water is guided away from the filter for prevent contamination. The housing may be made of plastic material or metal material.

The aspect of the embodiments of the invention is based on the idea that fluid (air) cooled generators are prone to damage because of dirt and particles inserted by the cooling fluid. Further, it is based on the idea of changing the arrangement position of the filter device to the drive end side of the generator, such that the filter device and also the cooling system can be improved. In comparison to filter devices arranged at the non-drive end side of the generator the fluid (air) flow is provided from one side of the generator (drive end side) to the other side of the generator. Hence, an air flow through the generator is provided and not an air flow from one side through the generator and back to the same side. Therefore, the air flow may be simplified and simultaneously the power outcome of the generator may be improved.

For this purpose a filter device is used which is attached to the drive end of the generator such that a better cooling could be provided for the generator. The better cooling can be achieved by streaming the air from the front (drive end side) into the generator and not from the back (non-drive end side) of the generator, such that the air is directly guided through the generator. Further, as an advantageous effect more power outcome can be generated from the generator by using the filter device attached to the drive end of the generator.

According to a further embodiment of the invention the attaching element may be a magnet element. The magnet element may be fastened to the housing and may provide a magnetic contact between the housing of the filter device and the drive end side of the generator. According to this approach of the embodiment of the invention at least the drive end side comprises a magnetically material to which the magnet element may be attachable. For instance, the drive end side of the generator may comprise the magnetic material at least at the position where the magnet element is attachable to the drive end, such that only a part of the drive end side has to be made of a magnetic material. It may also be possible, that the drive end side may comprise a respective magnet element attached to the drive end and which may be configured for receiving the magnet element of the filter device. Further, the drive end side may be made of metal material, such that a magnetic interaction with the magnetic attachment element can be generated.

By using a magnet element the use of clamps or screws may be obsolete such that no stresses to the drive end side are created. The stresses at the drive end side are caused by the clamps or screws which have to form a contact through the drive end side. This stresses are overcome by using a magnetic attaching element. Furthermore, the housing may be attached very fast when using a magnet, because no tools have to be used for attaching the housing of the filter device by a magnetically attaching element.

According to a further embodiment of the invention the filter device further comprises an adapter element comprising the at least one attaching element, wherein the adapter element has a first side which is attached to the housing. The adapter element has a second side which is attachable to the wind turbine by the attaching element, wherein the first side and the second side oppose each other. Further, the adapter element comprises an opening extending from the first side to the second side and is configured for guiding air from the filter to the generator.

The adapter element may be formed as a part which is able to provide a mechanical connection between the housing of the filter device and the drive end side of the generator. The to be filtered air is guided through the filter inside the housing of the filter device. After passing the filter, the air is guided through the adapter element, in particular through the opening of the adapter element into the generator. The adapter element may be coupled to the housing by clamps and/or screws. In particular, the first side of the adapter element may be coupled by clamps and/or screws to the housing. The second side of the adapter element may comprise the attaching element by which the filter device may be coupled to the drive end of the generator. Hence, the filter device may be arrangeable inside the wind turbine between the generator and the spinner of the wind turbine. In particular, the filter device may be arrangeable inside the space provided between the spinner and the hub of the wind turbine.

The opening of the adapter element may be an opening which provides an air flow through the adapter. For example, the opening may be adapted and aligned to a further opening of the drive end side of the generator. The further opening may provide an air channel for the filtered air to the interior of the generator. By adapting the opening of the adapter element to the further opening the air flow between the filter device and the generator may be ensured.

According to a further embodiment of the invention the filter device further comprises a mesh coupled to the housing, wherein the mesh is configured for providing an EMF shielding for the generator.

The mesh may be made of an electrical conductive material, in particular the mesh may be a metal mesh. More in particular, the mesh may be a steel mesh. The mesh may be a metal structure comprised of a plurality of first wires and a plurality of second wires, wherein the plurality of first wires and the plurality of second wires are crossing each other. By using an electrical conductive mesh it may be ensured to provide an electromagnetic field (EMF) shielding for the generator. The housing of the filter device may have a housing opening for guiding the air flow through the housing, this may correspond to the further opening of the drive end side of the generator (or to a hole in a housing of the generator) for receiving the air flow. Because of the further opening in the drive end side (or because of the hole in housing of the generator) the electromagnetic field may emit out of the generator. For preventing the emitting of the electromagnetic field the opening (or the opening of the housing) of the filter device may be covered by the mesh. Thus, product standards relating to the EMF shielding of a generator may be met.

Further, the mesh may be grounded by an electrically conducting connection to the generator, in particular, by connecting the mesh to grounded parts of the generator or to a nacelle of the wind turbine. This means, when the mesh is connected to the generator the mesh together with the generator provides the EMF shielding.

According to a further embodiment of the invention the mesh is arranged at the adapter element, wherein the mesh is configured for covering the opening of the adapter element.

For preventing the extending of the electromagnetic field the opening of the adapter element may be covered by the mesh. The mesh may be arranged at the second side of the adapter element, such that the opening of the adapter element may be covered. In other words, the further opening of the drive end side is covered by the mesh arranged inside the further opening, such that the EMF shield generated by the drive end side (and other generator parts, like generator housing, rotor housing) is maintained. Thus, EMF shielding of the generator may be maintained.

According to a further embodiment of the invention the filter device further comprises a sealing element, wherein the sealing element is arranged at the second side of the adapter element. The sealing element is configured for being arranged between the adapter element and the generator, such that a fluid connection between the filter and the generator is sealed.

In general speaking the sealing element is arranged between the filter device and the generator, in particular between the filter device and the drive end of the generator. The sealing element may be one of the group consisting of an o-ring, a flat sealing, a flat gasket, acrylic resin sealant, a rubber material, or a silicone sealant. The sealing element may be formed in such a manner that it is adapted to the form of the opening of the adapter element. This means, when the opening may have an oval (or rectangular) shape the surrounding sealing element may have also an oval (or rectangular) shape. On the one side the sealing element may be arranged such that it is directly surrounding the to be sealed opening. On the other side the sealing element may be arranged such that it surrounds the opening of the adapter element and the attaching element.

According to a further embodiment of the invention the filter device further comprises fastening elements for fastening the housing to the adapter element.

For providing a connection between the housing and the adapter element fastening elements may be used. The fastening elements may be a clamp, in particular a flat spring clamp. The flat spring clamps may be detachable from the upwind side. The housing and the adapter element both may be formed in such a manner that both comprise a respective recess for the clamp. The fastening element may be at least two clamps. For each clamp respective engaging recesses are formed at the housing and at the adapter element for ensuring a proper clamping. The clamp may be easily removed when a changing of the filter inside the housing becomes necessary.

According to a further embodiment of the invention further fastening elements may be used for fastening the filter to the adapter element. This may achieve a secured and fastened position of the filter at the adapter element. The further fastening element may also be a clamp, in particular a spring clamp.

According to a further embodiment of the invention a further sealing element may be arrangeable between the housing and the adapter element. The fastening elements may fasten the housing and the adapter element and the further sealing element may provide a sealed connection. Hence, a sealed air flow from the housing to the adapter element may be provided, such that the air cannot be contaminated, in particular, the further sealing element may seal the adapter element against the filter inside housing.

According to a further embodiment of the invention the attaching element further comprises at least one of the group consisting of a snap catch, a clamp, a bolt, magnet, and a spring catch.

By using at least one of the attaching element, the position of the attaching element may be secured such that the filter device may be attached to the drive end side by the attaching element in a right manner.

According to a further aspect of the embodiment there is provided a wind turbine comprising a filter device, a generator, wherein the filter device is attached to a drive end side of the generator of the wind turbine.

This aspect of the embodiments of the invention is based on the idea that generator in wind turbines are fluid cooled generators. These fluid cooled generators are prone to damage because of dirt and particles inserted by the cooling fluid. By changing the arrangement position of the filter device to the drive end side of the generator the filter device and also the cooling system can be improved. Further, the filter device may be simplified.

For this purpose a filter device as described above is applied.

According to a further embodiment of the invention the drive end side of the generator is formed as an axially outermost part of the generator.

The drive end side may be formed as a circumferentially extending ring at the axially outermost part of the generator. Further, the drive end side may be a part of the housing of the generator facing the hub of the wind turbine. Furthermore, the drive end side may be a housing of a rotor of the generator. The housing of the rotor may have a closed side facing the hub of the wind turbine, such that the further opening of the drive end side may be a further opening in the housing of the rotor. This means, that the filter device may be arranged at the housing of the rotor of the generator.

According to this embodiment, the fluid may flow from the outside through the housing of the filter device, through the opening of the adapter element through the further opening in the housing of the rotor into the generator. Hence, a direct fluid flow from the front side of the generator to the back side of the generator may be generated.

According to a further embodiment of the invention the wind turbine comprises a plurality of filter devices attached spaced apart from each other to the drive end side of the generator.

Each filter device may be formed as described above and may comprise a housing having a filter and further comprises an attaching element for attaching each of the filter devices to the drive end side of the generator. Further, each of the filter devices may comprise an adapter element configured for providing a connection between the housing of the filter device and the drive end side of the generator. The plurality of filter devices may be arranged in groups circumferentially along the drive end side. Another arrangement configuration may be that the plurality of filter devices may be arranged spaced apart from each other with the same distance between each other.

According to a further embodiment of the invention the wind turbine comprises a spinner, wherein the filter device is arranged between the drive end side of the generator and the spinner.

The spinner according to this embodiment may be a fiber glass cover of the hub of the wind turbine, such that the spinner covers the hub. In between the spinner and the hub a space is created, wherein the air inside this created space is filtered by the filter device and will be provided into the generator. The filter device may be arranged in this space, such that the filter device may be arranged between the hub and the spinner, in particular between the generator and the hub.

According to a further embodiment of the invention the drive end side of the generator comprises a further opening configured for receiving the adapter element of the filter device, wherein the opening of the adapter element and the further opening of the drive end side of the generator are forming an air channel for guiding air into the generator.

According to a further embodiment of the method, before the attaching of the filter device to the drive end side, the housing is attached to an adapter element. At first the adapter element may be fastened to the housing by use of fastening elements. Secondly, a sealing element may be provided at one side of the adapter element, in particular at the second side of the adapter element. After this, the filter device may be attached to the drive end side of the generator by the attaching element.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION

Some of the embodiments will be described in detail, with reference to the following figures, wherein like designations denote like members, wherein.

DETAILED DESCRIPTION

Figure 1:
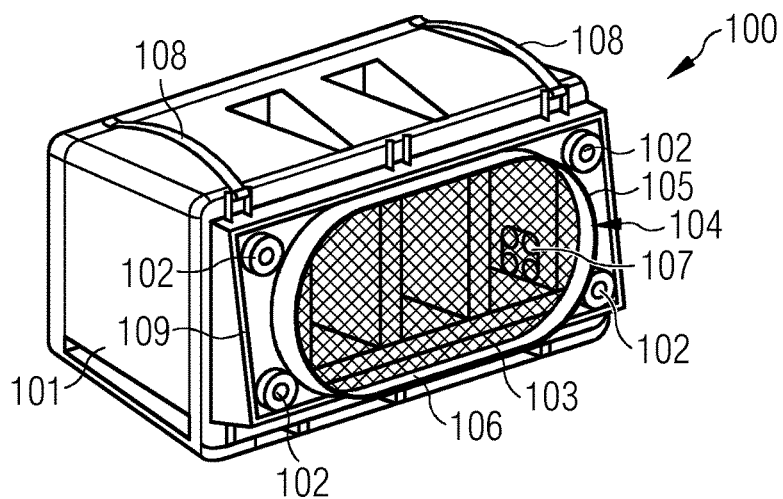
FIG. 1 shows a first view of a filter device according to an embodiment the present invention.

The illustration in the drawing is schematical. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ front the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

FIG. 1 shows a filter device 100 for providing air for a generator of a wind turbine. The filter device 100 comprises a housing 101 comprising a filter 103, at least one attaching element 102 configured for attaching the housing 101 to a drive end side of the generator, such that the air is guidable through the filter 103 into the generator. As can be seen from FIG. 1 the filter device 100 comprises four attaching elements 102. The housing 101 is a cuboid, wherein at one side of the housing 101 each of the four attaching element 102 is arranged in one corner of the one side of the housing 101. Further, the filter device 100 comprises an adapter element 104. The adapter element 104 has a first side, which cannot be seen in FIG. 1, by this first side the adapter element 104 is attached to the housing 101. The adapter element 104 has a second side 105, which is the visible front side in FIG. 1. The first side and the second side 105 of the adapter element 104 oppose each other. The adapter element 104 comprises an opening 106 extending from the first side to the second side 105. The opening 106 is configured for guiding air through the filter 103 into the generator. As can be seen in FIG. 1 the opening 106 has an oval shape. The filter 103 inside the housing 101 comprises ribs of filter material. Further, the filter device 100 comprises a mesh 107, which is illustrated as a darker spot in FIG. 1. The mesh 107 is coupled to the housing 101, such that it is arranged between the first side of the adapter element 104 and the housing 101, wherein the mesh 107 covers the opening 106 of the adapter element 104. In other words the mesh 107 is arranged at the side of the housing 101 which is coupled to the adapter element 104. On the other side the mesh 107 can be coupled to the first side of the adapter element 104. Furthermore, the mesh 107 is arranged directly at the adapter element 104 and covers the opening 106 of the adapter element 104. The mesh 107 may be arranged at the second side 105 of the adapter element 104 and provides an electrical conductive connection to grounded parts of the generator or a nacelle of the wind turbine.

Further, the filter device 100 comprises a sealing element 109, wherein the sealing element 109 is arranged between the adapter element 104 and the generator, such that a fluid connection between the filter 103 and the generator is sealed. As can be seen in FIG. 1 the sealing element 109 has a rectangular shape. The opening 106 and the attaching elements 102 are surrounded by the rectangular sealing element 109.

Further, the filter device 100 comprises fastening elements 108. As can be seen from FIG. 1 the filter device 100 comprises at least two fastening elements 108. The filter device may comprise four fastening elements 108, wherein only the two fastening elements 108 on top of the housing 101 are visible in FIG. 1. The fastening elements 108 are formed as clamps, wherein the clamps are attached from the left side (the side of the housing 101 which extends into the direction of the hub) of the housing 101 to the adapter element 104.

Figure 2:
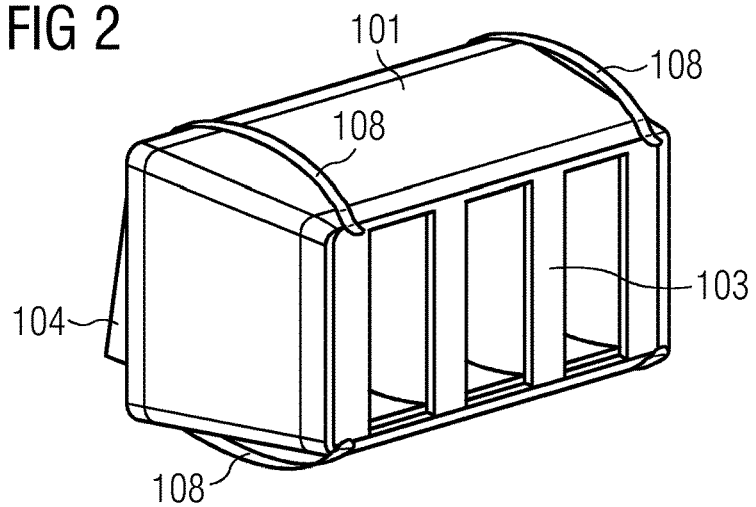
FIG. 2 shows a second view of a filter device according to an embodiment the present invention.

FIG. 2 shows a filter device 100 according to an embodiment of the invention. The filter device 10 is shown from the side which extends into the direction of the hub and/or the spinner of the wind turbine. In this figure the adapter element 104 is not full visible. From this view the filter 103 formed of rib elements is visible. In particular it can be seen from this figure, that the filter 103 comprises four ribs and in between these ribs three recesses (or cuts) are formed. The fastening elements 108 are attached from the side of the housing 101 which extends into the direction of the hub over the whole housing 101 to the adapter element 104.

Figure 3:
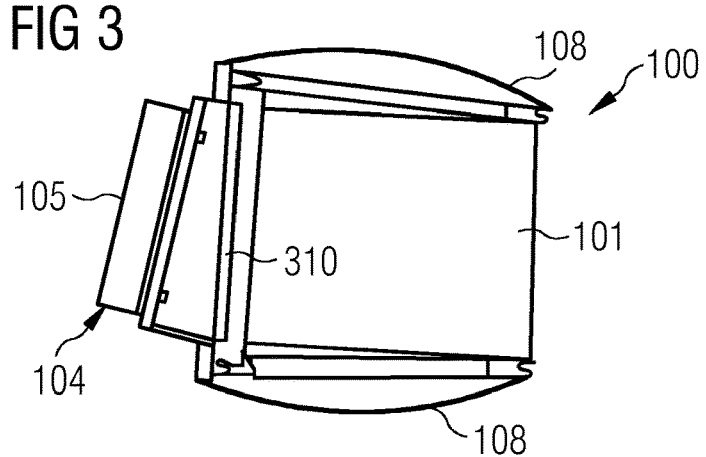
FIG. 3 shows a third view of a filter device according to an embodiment the present invention.

FIG. 3 shows another view of the filter device 100, wherein the filter device 100 is shown from a side view. As can be seen, the fastening elements 108 are arranged at the top and at the bottom of the housing 101. Further, both the first side 310 and the second side 105 of the adapter element 104 can be seen.

Figure 4:
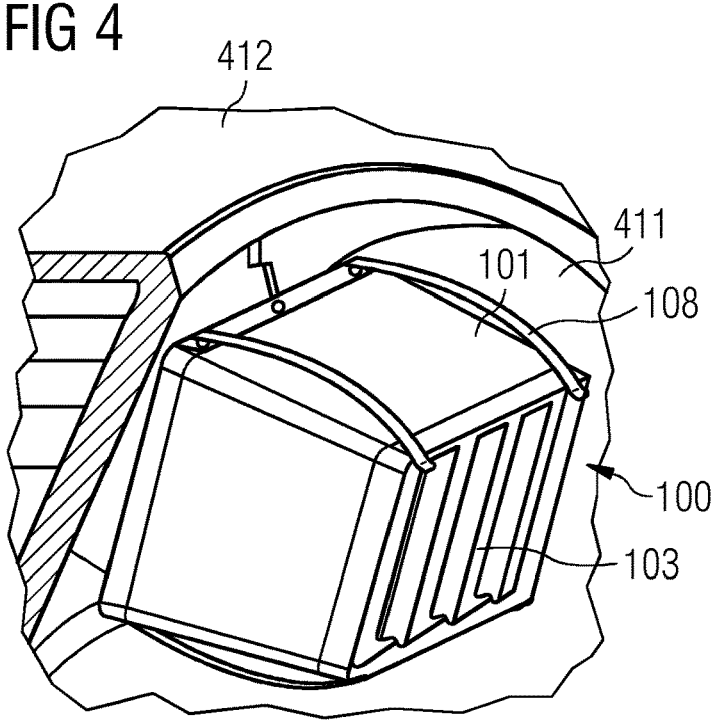
FIG. 4 shows an attachment of a filter device according to an embodiment of the present invention to a drive end side of a generator.

FIG. 4 shows a filter device 100 according to an embodiment of the invention, attached to a drive end side 411 of a generator 412. The second side 105 of the adapter element 104 is coupled to the drive end 411. The adapter element 104 is received by a further opening (not visible) of the drive end 411, wherein the second side 105 of the adapter element 104 extends through the further opening of the drive end 411. The side of the housing 101 extending into the direction of the hub of the wind turbine may be additionally equipped with a mist eliminator and/or a heater to remove water and moist from the filter device 100.

Figure 5:
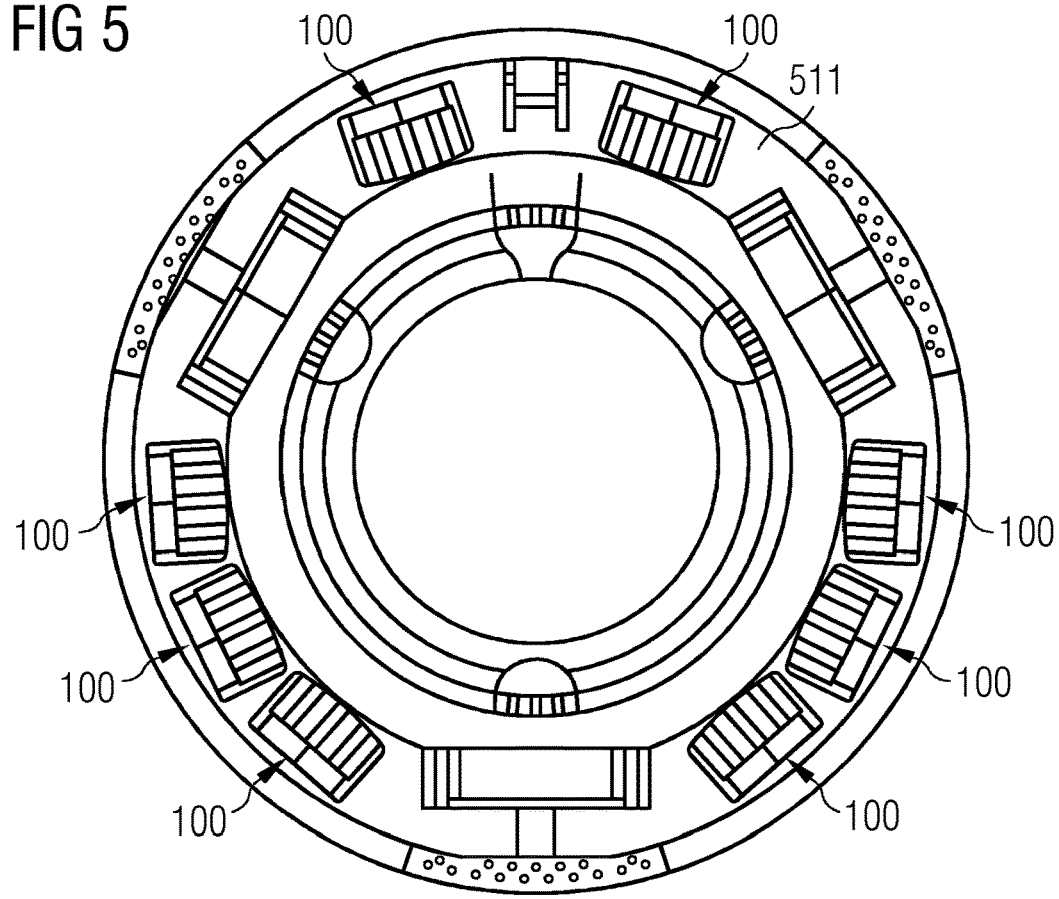
FIG. 5 shows a further attachment of a filter device according to an embodiment of present invention to a drive end side of a generator.

FIG. 5 shows an arrangement of a plurality of filter devices 100 at a drive end 511 of a generator. The plurality of filter devices 100 are attached spaced apart from each other to the drive end 511 of the generator. As can be seen four groups of filter devices 100 are formed, wherein at least two groups comprise at least three filter devices 100 and at least two further groups comprise only one filter device 100.

The filter devices 100 and the parts of the filter devices 100 have to be small enough that they can be delivered through a hole in the hub. Further, the parts of the filter device 100 have to be small, such that they can be attached and removed in the small space inside the wind turbine. As can be seen from FIG. 5 the drive end 511 is a circumferentially extending ring, wherein the ring forms a part of a housing of the generator. The filter devices 100 are attached at the circumferentially outmost part of the housing of the generator.

Figure 6:
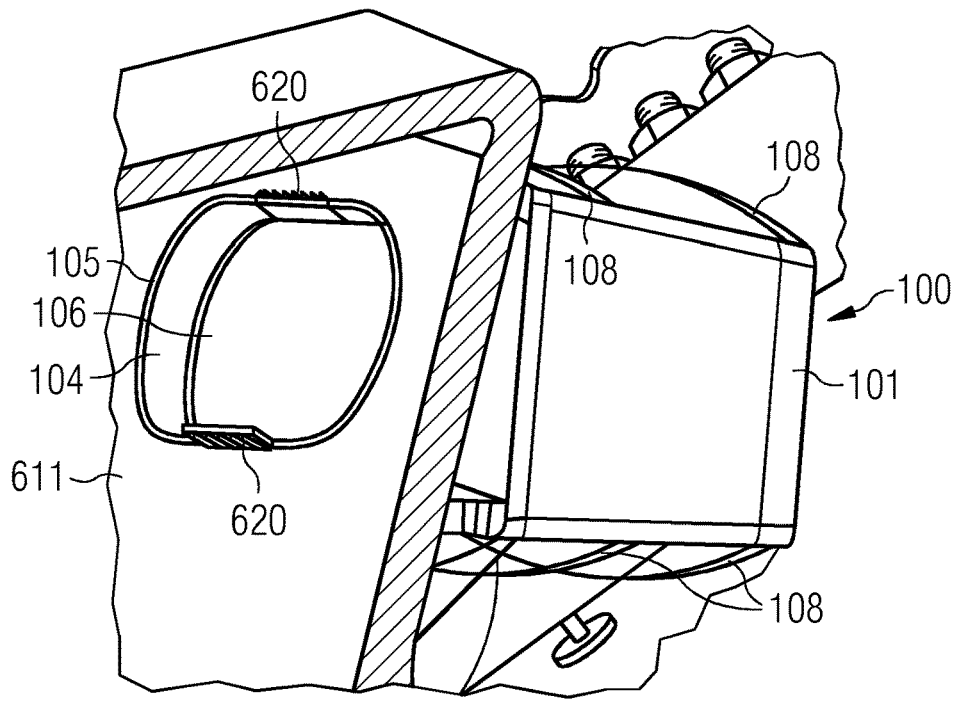
FIG. 6 shows a further attachment of a filter device according to an embodiment of the present invention to a drive end of a generator.

FIG. 6 shows an arrangement of a filter device 100, wherein the filter device 100 is attached to the drive end 611 by a snap catch 620. The snap catch 620 is a part of the attaching element 102 and is formed as a part of the adapter element 104. The snap catch 620 is snapping over the drive end 611 of the generator, such that the adapter element 104 is fixed inside the further opening of the drive end. The adapter element 104 is formed in such a manner that it fits through the further opening, in particular such that the adapter element 104 has the same shape as the further opening. The second side 105 of the adapter element 104 is positioned at the side (left side) of the drive end 611, which faces away from the hub (the spinner). All other parts of the filter device 100 are located at the side (right side) of the drive end 611, which faces the hub (the spinner) of the wind turbine. Further, as can be seen in FIG. 6 the drive end 611 forms a part of the housing the generator. Specifically, a side wall of the housing forms the drive end 611 and extends in radial direction.

Figure 7:
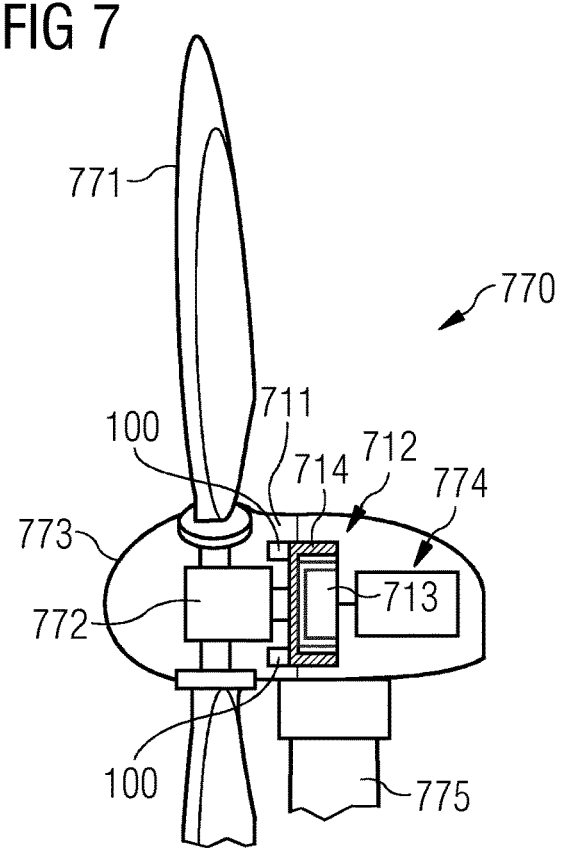
FIG. 7 shows a schematical illustration of the arrangement of a filter device according to an embodiment of the present invention in a wind turbine.

FIG. 7 shows an arrangement of filter devices 100 inside of a wind turbine 770. The wind turbine 770 comprises a nacelle 774. In the nacelle 774 the generator 712 is arranged. The nacelle 774 is placed on a tower 775 of the wind turbine 770. At the front (left side in FIG. 7) the hub 772 covered by the spinner 773 is located. At the hub 772 the blades 771 are arranged. The generator 712 comprises of a stator 713 and a rotor 714. The filter devices 100 are attached at the outer drive end side of the generator 712. The filter devices 100 are arranged at the circumferentially outermost part of the generator 712 and the filter devices 100 extend in the direction to the hub 772. As can be seen, the filter device(s) 100 is (are) arranged between the generator 712 and the hub 772. The filter devices 100 are arranged at the rotor 714 of the generator 712, in particular the filter devices 100 are arranged at a rotor housing of the rotor 714. Further, the filter devices 100 are arranged at the drive end 711 of the rotor 714, located in the space between the spinner 773 and the hub 772. According to this embodiment the drive end 711 of the generator 712 is the side of the generator 712 facing to the hub 772. As can be seen in FIG. 7 the generator 712 is enclosed from the drive end 711, which is in contact with the nacelle, such that only the filter device 100 forms an fluid connection between the side of the generator facing the hub 772 and the side of the generator facing away from the hub 772.

Figure 8:
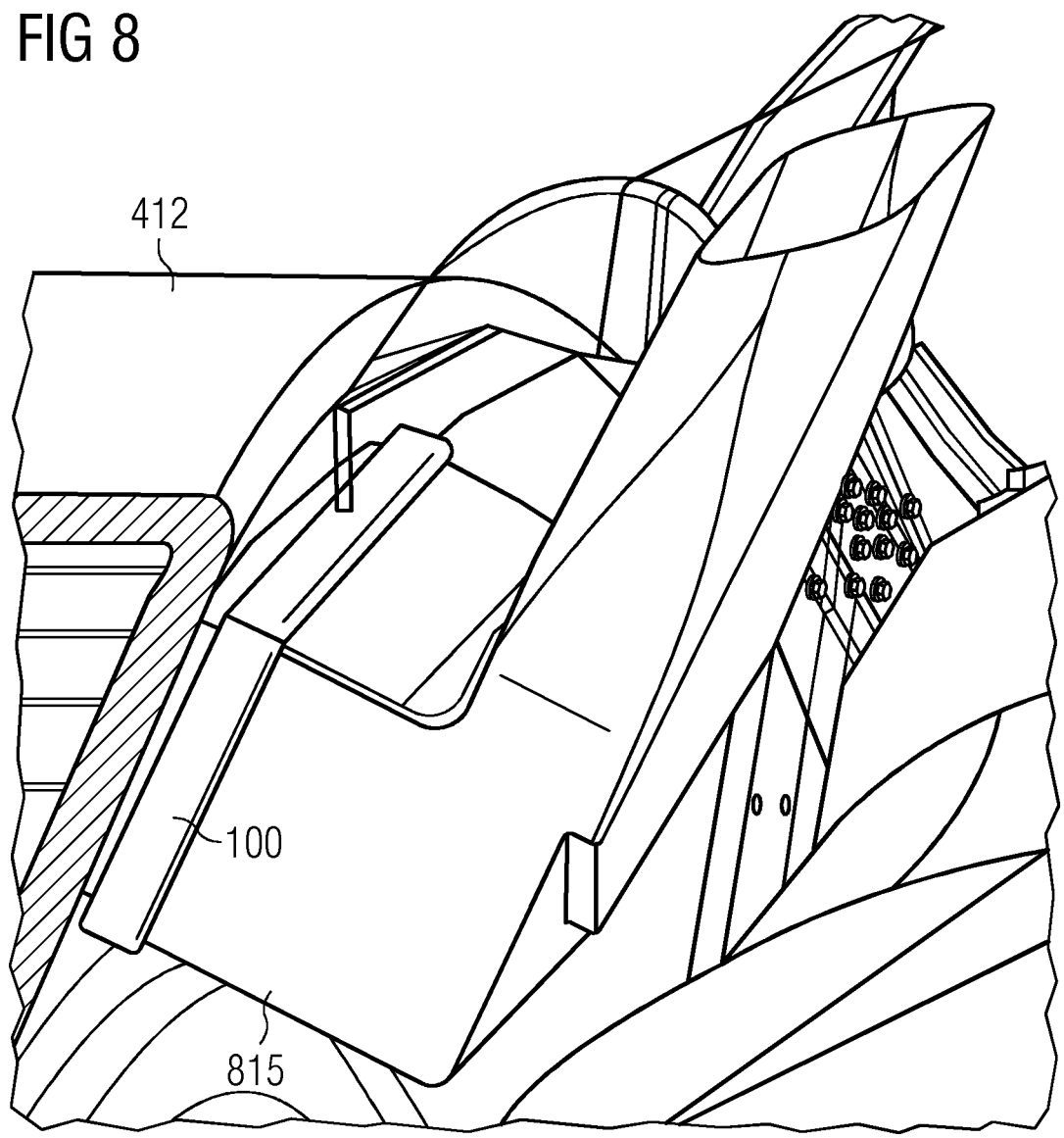
FIG. 8 shows a filter device according to an exemplary embodiment of the invention equipped with a mist eliminator.

FIG. 8 shows a filter device 100 according to an exemplary embodiment of the invention equipped with a mist eliminator 815. The mist eliminator 815 forms an envelope for the filter device 100, so that the housing 101 of the filter device 100 is covered by the mist eliminator 815. The mist eliminator 815 has a first fluid outlet adapted to a fluid inlet of the housing 101 of the filter device 100. On a top side, the mist eliminator 815 comprises a fluid inlet, e.g. an oval shaped fluid inlet. The air is streaming through the mist eliminator 815 from the fluid inlet to the fluid outlet into the filter device 100. A fluid channel between the fluid inlet and the fluid outlet of the mist eliminator 815 is formed in such a way, that the fluid inlet direction of the fluid passing the fluid inlet is perpendicular to the fluid outlet direction of the fluid passing the fluid outlet. The mist eliminator 815 may also comprise a heater for removing water and moist. The mist eliminator 815 extends radially outward from the generator axis, such that water and moist are removed.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A filter device configured for providing air for a generator of a wind turbine, the filter device comprising:
   a housing comprising a filter; and
   at least one attaching element that attaches the housing to a drive end side of the generator, such that the air is guidable through the filter into the generator, wherein the drive end side of the generator is formed as an axially outermost part of the generator facing a hub of the wind turbine so that the filter device is located between the hub and the generator; and
   an adapter element comprising the at least one attaching element, having a first side which is attached to the housing and a second side coupled to the drive end side of the generator by the at least one attaching element such that the second side is configured to extend into an opening of the drive end side of the generator, wherein the adapter element comprises an opening extending from the first side to the second side and configured for guiding air from the filter into the generator, and the second side extends into the drive.

2. The filter device according to claim 1, wherein the at least one attaching element is configured for detachably attaching the housing to the drive end side.

3. The filter device according to claim 1, wherein the at least one attaching element is a magnet element.

4. The filter device according to claim 1, further comprising:
   a mesh coupled to the housing, wherein the mesh is configured for providing an electromagnetic field (EMF) shielding for the generator.

5. The filter device according to claim 4, wherein the mesh is arranged at an adapter element, and is configured for covering the opening of the adapter element.

6. The filter device according to claim 1, further comprising:
   a sealing element,
   wherein the sealing element is arranged at the second side of the adapter element,
   wherein the sealing element is configured for being arranged between the adapter element and the generator, such that a fluid connection between the filter and the generator is sealed.

7. The filter device according to claim 1, further comprising:
   fastening elements for fastening the housing to the adapter element.

8. The filter device according to claim 1, wherein the at least one attaching element further comprises at least one of the group consisting of a snap catch, a clamp, a bolt, magnet, and a spring catch.

9. A wind turbine comprising:
a filter device according to claim 1, and
a generator,
wherein the filter device is attached to a drive end side of the generator of the wind turbine;
wherein the drive end side of the generator is formed as an axially outermost part of the generator.

10. The wind turbine according to claim 9, wherein the wind turbine comprises a plurality of filter devices attached spaced apart from each other to the drive end side of the generator.

11. The wind turbine according to claim 9, comprising a spinner, wherein the filter device is arranged between the drive end side of the generator and the spinner.

12. The wind turbine according to claim 9,
wherein the drive end side of the generator comprises a further opening configured for receiving the adapter element of the filter device,
wherein the opening of the adapter element and the further opening of the drive end side of the generator are forming an air channel for guiding air into the generator.

13. A method for arranging a filter device configured for providing air for a generator of a wind turbine, the method comprising:
attaching a housing of the filter device by at least one attaching element to a drive end side of a generator of the wind turbine, such that the air is guidable through the filter device into the generator, wherein the drive end side of the generator is formed as an axially outermost part of the generator so that the filter device is located between the hub and the generator, wherein the filter devices includes an adapter element comprising the at least one attaching element, having a first side which is attached to the housing and a second side coupled to the drive end side of the generator by the at least one attaching element such that the second side is configured to extend into an opening of the drive end side of the generator, wherein the adapter element comprises an opening extending from the first side to the second side and configured for guiding air from the filter into the generator, and the second side extends into the drive.

* * * * *